United States Patent Office 3,213,160
Patented Oct. 19, 1965

3,213,160
BLENDS OF SYNTHETIC TRANS-POLYISOPRENE AND TRANS-POLYBUTADIENE
Willie W. Crouch, Bartlesville, Okla., assignor to Phillips Petroleum Company, a corporation of Delaware
No Drawing. Filed Sept. 17, 1962, Ser. No. 224,220
4 Claims. (Cl. 260—894)

This invention relates to rubber compositions. In one aspect, the invention relates to a method for increasing the crystallization rate of synthetic trans-polyisoprene. In another aspect, it relates to a novel composition containing trans-polyisoprene.

In recent years a great deal of research work has been directed toward the production of improved rubbery polymers. It has been discovered that polymers having a desired configuration can be prepared by the utilization of so-called stereospecific catalysts. One polymer that has been prepared by the use of such systems is a polyisoprene containing a very high percentage of trans-unsaturation. Synthetic polymeric materials possess a number of advantages over their naturally occurring counterparts. Such is the case with synthetic trans-polyisoprene in contrast to balata and gutta-percha, which are natural rubbers formed by trans 1,4-addition of isoprene. Various properties of synthetic trans-polyisoprene, including molecular weight, can be controlled by the method employed in their preparation whereas modifications in the natural products can be accomplished only by special treatment, such as by the incorporation of additives. In the manufacture of various types of molded objects, one of the important properties of a polymer relates to its crystallization rate or rate of hardening. While synthetic trans-polyisoprene possesses many desirable properties that render it suitable for the fabrication of molded articles, its use has been somewhat limited because its crystallization rate is often too slow in instances where substantially complete retention of the molded form is a requirement.

It is an object of this invention, therefore, to provide a method for increasing the crystallization rate of synthetic trans-polyisoprene.

Another object of the invention is to provide a novel composition containing trans-polyisoprene, the composition having a greatly increased crystallization rate.

A further object of the invention is to provide a composition containing trans-polyisoprene which is suitable for use in the fabrication of molded objects, such as golf balls.

Other and further objects and advantages of the invention will become apparent to those skilled in the art upon consideration of the accompanying disclosure.

The present invention resides in the discovery that the crystallization rate of trans-polyisoprene can be substantially increased with no material alteration in the other properties of the polymer by blending therewith a minor amount of trans-polybutadiene. Broadly speaking, the composition of this invention comprises a trans-polyisoprene and a trans-polybutadiene, the amount of the trans-polybutadiene being from 0.75 to 3.0 parts by weight per 100 parts by weight of the mixture of trans-polyisoprene and trans-polybutadiene. In a preferred embodiment, from 1.0 to 2.5 parts by weight of the trans-polybutadiene is blended with the trans-polyisoprene. It has been found to be necessary to employ the recited amounts of trans-polybutadiene in preparing the composition of this invention. Smaller amounts do not give the desired rapid crystallization rate while larger amounts have a tendency to modify other properties of the trans-polyisoprene, often resulting in a substantial decrease or disappearance of some of the characteristics which it is desired to retain.

One of the important applications of the composition of this invention is in the preparation of golf ball cover stock where a rapid crystallization rate is a requirement. A desirable golf ball cover stock should have good shell-forming properties and good final molding characteristics in order to provide a uniform cover thickness. The cover thickness must be uniform, for otherwise the ball will be out of balance and unsuitable for use. Because trans-polyisoprene per se possesses a slow crystallization rate, it is not generally satisfactory for use in preparing molded objects that have such rigid requirements. The present invention provides a method for increasing the crystallization rate several times and thereby making it a highly desirable material for golf ball cover stock as well as many other applications. In general, the composition of this invention can be used in applications where balata and gutta-percha have been conventionally employed.

The trans-polyisoprene used in the present composition contains a high percentage, e.g., at least 75 percent, of trans 1,4-addition. The trans-polyisoprene generally contains in the range of 75 to 95 percent and higher of trans 1,4-addition, the remainder of the polymer being formed by 3,4-addition, 1,2-addition and cis 1,4-addition. The trans-polybutadiene employed in the present composition usually contains at least 70 percent, e.g., from about 70 to 95 percent and higher, of trans 1,4-addition, the remainder of the polymer being formed by 1,2-addition and cis 1,4-addition. The amount of unsaturation, other than trans-unsaturation, present in these polymers appears to be immaterial. It is to be understood that the present invention is in general applicable to any synthetic polyisoprenes and polybutadienes in which the above-mentioned percentages of the polymers are formed by trans 1,4-addition of the monomers.

The present invention is applicable to blends of trans-polyisoprenes and trans-polybutadienes regardless of the method employed in preparing the polymers. One method that can be advantageously utilized in preparing the polymers comprises the step of polymerizing 1,3-butadiene or isoprene in the presence of a catalyst composition comprising (a) a complex aluminum hydride of an alkali metal, such as lithium aluminum hydride, and (b) titanium tetraiodide. The amount of the hydride used in the catalyst composition is usually in the range of 0.5 to 6 mols per mol of titanium teraiodide with a preferred mol ratio being from 1.3 to 3.0. The polymerization is generally carried out at a temperature in the range of 10° C. to 80° C. in the presence of an inert hydrocarbon diluent. Diluents suitable for use include aromatics, such as benzene and toluene, and paraffins, such as normal pentane and iso-octane. It is frequently preferred to charge the complex aluminum hydride to the reactor as a solution in a dialkyl ether, such as diethyl ether. This method for preparing trans-polyisoprenes and trans-polybutadienes is described in detail by R. P. Zelinski and D. R. Smith in U.S. Patent No. 3,050,513.

The composition of this invention can be prepared by blending the polymers by any suitable method. A convenient method for preparing the composition is to blend solutions of the polymers in a hydrocarbon solvent. The product is then recovered by conventional methods, such as by steam stripping, coagulation in an alcohol, such as isopropyl alcohol, or the like. Another suitable method for preparing the composition is to blend the materials on a roll mill, in a Banbury mixer, or similar kneading device. The temperature employed in the blending can vary over a wide range. For example, the blending can be accomplished at room temperature (20° C.) or at elevated temperatures, e.g., up to 150° C. The only limitation regarding the temperature is that it should not be so high as to cause degradation of the polymers.

A more comprehensive understanding of the invention can be obtained by referring to the following illustrative example which is not intended, however, to be unduly limitative of the invention.

EXAMPLE

A series of runs was conducted to demonstrate that by blending trans-polyisoprene with trans-polybutadiene the crystallization rate of the former is materially increased. The polymers were prepared by polymerizing the respective monomers, i.e., 1,3-butadiene or isoprene, with a catalyst consisting of an ether solution of lithium aluminum hydride and titanium tetraiodide. Each of the polymers contained about 90 percent trans 1,4-addition.

The rate of crystallization of the trans-polyisoprene, and of blends thereof with minor amounts of the trans-polybutadiene was determined. The procedure followed in making the determinations was to roll a 0.25 gram sample into a tight ball and press it out to a thickness of 1 millimeter between two microscope slides. This assembly was then heated in an oven at 70 to 80° C. for 30 minutes, after which it was removed from the oven and placed between polarizing plates at room temperature (23–25° C.). The time from removal from the oven until first signs of crystallization appeared was noted and also when crystallization appeared complete. The polarizing plates were arranged one on top of the other so that the least light passed through them. When a non-crystallized sample was placed between the plates, very little light passed through. Light spots appeared in the sample at the first sign of crystallinity and increased as crystallinity progressed.

The results obtained in the above-described tests are shown in the following table.

*Table*

| Parts by weight | | Start of crystallization | Completion of crystallization |
|---|---|---|---|
| Trans-polyisoprene | Trans-polybutadiene | | |
| 99 | 1 | Approx. 3 min. | 15 minutes. |
| 98 | 2 | 20 seconds | 5 minutes. |
| 100 | | 20 minutes | 27 minutes. |

A sample of highly purified balata was tested in a similar manner to determine its crystallization rate. The sample began to crystallize in 1.25 minutes, and crystallization was substantially complete in 4 minutes.

These results demonstrate that very small amounts of transpolybutadiene caused a pronounced increase in the crystallization rate of trans-polyisoprene. The data also show that the blends of this invention have a crystallization rate that is comparable to that of balata.

As will be evident to those skilled in the art, many variations and modifications of the invention can be practiced in view of the foregoing disclosure. Such variations and modifications are clearly believed to come within the spirit and scope of the invention.

I claim:

1. A composition of matter comprising (1) a synthetic polyisoprene containing at least 75 percent trans-1,4-addition, and (2) a synthetic polybutadiene containing at least 70 percent trans 1,4-addition, the amount of said polybutadiene being in the range of 0.75 to 3.0 parts by weight per 100 parts by weight of said polyisoprene and said polybutadiene.

2. The composition of claim 1 in which said blend contains from 1.0 to 2.5 parts by weight of said polybutadiene containing at least 70 percent trans 1,4-addition.

3. A method for increasing the crystallization rate of synthetic trans-polyisoprene which comprises blending said trans-polyisoprene, containing at least 75 percent trans-1,4-addition, with a synthetic trans-polybutadiene, containing at least 70 percent trans - 1,4-addition, the amount of said trans-polybutadiene being in the range of 0.75 to 3.0 parts by weight per 100 parts of said trans-polyisoprene and said trans-polybutadiene.

4. The method of claim 3 in which the amount of said trans-polybutadiene is in the range of 1.0 to 2.5 parts by weight.

References Cited by the Examiner

UNITED STATES PATENTS 3,050,513  8/62  Zelinski et al. _____ 260—94.3
3,060,989  10/62  Railsback et al. _____ 260—5

FOREIGN PATENTS 515,334  12/39  Great Britain.

MURRAY TILLMAN, *Primary Examiner.*
WILLIAM H. SHORT, *Examiner.*